May 19, 1953

C. W. SHERWIN 2,639,402

SWEEP CIRCUIT

Filed Dec. 29, 1944

INVENTOR.
CHALMERS W. SHERWIN
BY
*William D. Hall.*
ATTORNEY

Patented May 19, 1953

2,639,402

UNITED STATES PATENT OFFICE 2,639,402

SWEEP CIRCUIT

Chalmers W. Sherwin, Belmont, Mass., assignor, by mesne assignments, to the United States of America as represented by the Secretary of War Application December 29, 1944, Serial No. 570,416

5 Claims. (Cl. 315—22)

This invention relates to circuits for generating high-speed sweep energy to be used for deflecting the beam of a cathode-ray oscilloscope, e. g., to provide a substantially linear time-base therefor.

In accordance with this invention, a transient voltage is generated by shock-exciting a reactive circuit, and then applied to the deflecting circuit of the cathode ray tube. Since only a portion of this voltage varies linearly with time, a square-wave gating voltage is derived and used to block the beam of the tube for the duration of the non-linear portion of the sweep.

For a better understanding of the invention, together with other and further objects thereof, reference is had to the following description taken in connection with the accompanying drawing, in which.

Figure 1:
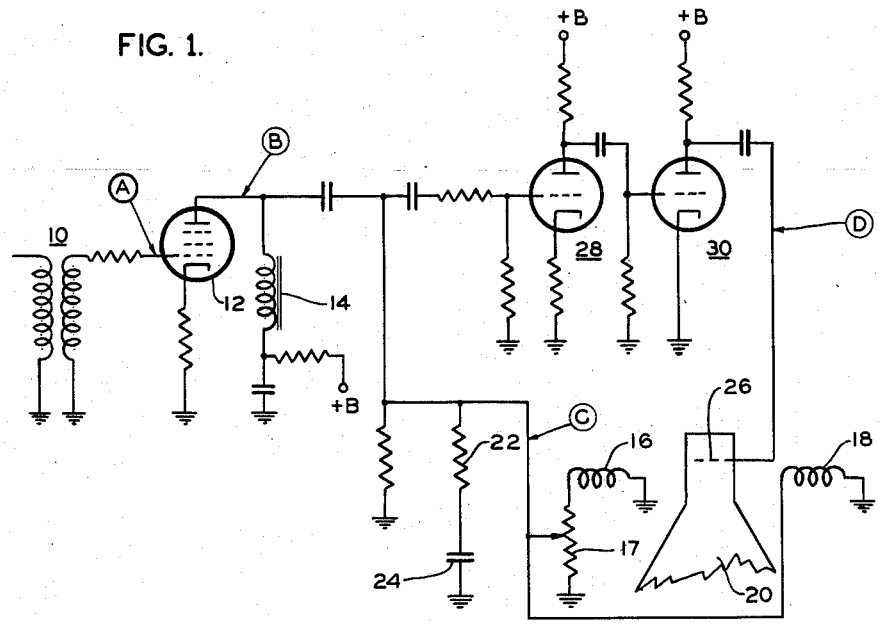
Fig. 1 is a circuit diagram of the invention.
Figure 2:
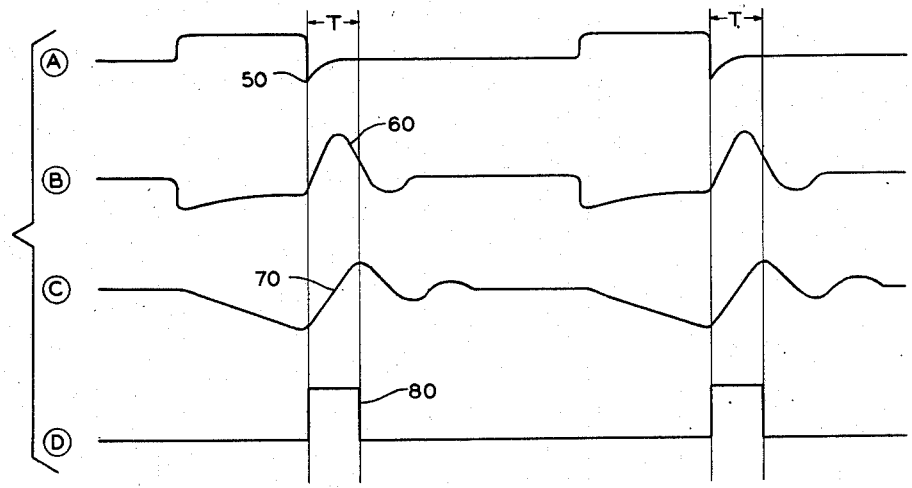
Fig. 2 is a group of wave forms illustrating the operation of the circuit in Fig. 1.

Referring to the drawing, a square-wave voltage is applied to a transformer 10, which distorts the wave to the form shown at A in Fig. 2. This wave has a sharp negative peak portion 50 at the trailing edge thereof, which rapidly cuts off the plate current through a pentode tube 12 and through an inductance 14 in the plate circuit thereof. Since said inductance tends to keep the plate current flowing, a sharp positive and highly damped transient-voltage is developed across said inductance. This transient voltage is indicated at 60 in curve B which shows the variation of potential at the plate of tube 12.

This transient voltage produces a transient current through deflecting coils 16 and 18 of cathode-ray tube 20. An adjustable potentiometer 17 is connected in the circuit with coil 16 to provide for equalizing the current through the deflecting coils. The wave form of the deflecting current is shown at C. It will be seen that during the time interval T this current is substantially linear, as shown at 70. The duration of this linear interval is controlled by the constants of the circuit including inductances of coil 14 and deflecting coils 16 and 18, and by the values of resistor 22 and capacitor 24, which can be made adjustable.

Since linear portion 70 is the only portion of the current wave used to provide the desired time base, it is desirable to blank out the cathode-ray beam during the remainder of the time. For this purpose, the voltage wave 60 is applied to a plurality of clipper and wave-shaping amplifiers 28 and 30, which shape the portion 60 of wave B into a square wave D which is then applied to the intensity grid 26 of tube 20. Wave D has a sharp positive portion 80 lasting only for the interval T. The positive portion 80 brightens the beam of the cathode-ray tube only during the time interval T, when the current wave is linear. For the remainder of the cycle the beam is suppressed or blocked.

A preferred embodiment of a wave circuit for magnetically deflecting a cathode-ray beam has been described. It will be obvious, however, that the same principles can be utilized for electrostatic beam deflection. Other uses and modifications will be obvious to those skilled in the art; and it is aimed in the appended claims to cover all such changes and modifications as fall within the true spirit and scope of the invention.

I claim:

1. An electron tube circuit comprising first and second electron discharge tubes having electron control means, said second tube being a cathode ray tube having a beam deflecting coil, reactance in the plate circuit of said first electron discharge tube, means to abruptly vary the impedance of said plate circuit to shock-excite said reactance and generate recurrent transient waves thereacross, each wave having a portion which varies substantially linearly with time, means to impress each wave in its entirety upon the beam deflecting coil of said second tube, means responsive to said waves to generate square waves having a peak only during the occurrence of each of said linearly varying portions, and means to impress said square waves upon the control electrode of said second tube in such direction as to brighten said tube only during the occurrence of each of said linearly varying portions.

2. In combination with a cathode-ray tube having beam deflecting means and beam-intensity control means, a sweep generating circuit comprising an electron tube having reactance in its plate circuit means to abruptly vary the impedance of said plate circuit at spaced intervals to shock-excite said reactance and generate thereacross highly damped waves, each having a portion which varies substantially linearly with time, means to impress each wave in its entirety upon said beam deflecting means, means to transform each of said waves to a square wave having a peak during the occurrence of said linearly varying portions, and means to impress said waves upon said beam-intensity control means to vary the brightness of said beam.

3. In combination with a cathode-ray tube having a beam deflecting coil, a sweep generating circuit comprising an electron tube having inductance in its plate circuit, means to abruptly vary the impedance of said plate circuit at spaced intervals to shock-excite said inductance and generate recurrent, highly damped waves thereacross, each wave having a portion which varies substantially linearly with time, a circuit for impressing each wave in its entirety upon said deflecting coil, and means to brighten said beam only during the occurrence of said linearly-varying portions.

4. In combination with a cathode ray tube having beam deflection coil means, a sweep generating circuit comprising electron tube means having at least a plate, a cathode, and a control grid, transformer means having its primary winding receptive of a series of square waves and its secondary winding coupled across said grid and said cathode, reactance means connected to said plate at one end and to a source of positive potential at the other end, whereby said series of square waves serve to shock-excite said reactance means and generate a series of highly damped waves thereacross, each of said damped waves having a portion that varies substantially linearly with time, and means for coupling said reactance means to said deflection coil means so as to produce a sweep on the face of said cathode ray tube.

5. The circuit of claim 4, further including means coupled between the plate of said tube means and the intensity grid of said cathode ray tube, for brightening the beam of said cathode ray tube only during the occurrence of the linear portion of each of said damped waves.

CHALMERS W. SHERWIN.

References Cited in the file of this patent

UNITED STATES PATENTS

| Number | Name | Date |
|---|---|---|
| 2,350,069 | Schrader et al. | May 30, 1944 |
| 2,363,810 | Schrader et al. | Nov. 28, 1944 |
| 2,416,290 | Depp | Feb. 25, 1947 |

OTHER REFERENCES

Sherman, "The Generation for Television of Horizontal Synchronizing Pulses from Vertical Pulses by Means of Impulse Excitation," proceedings of I. R. E., pages 406 to 409, September 1940.